Figure 1:
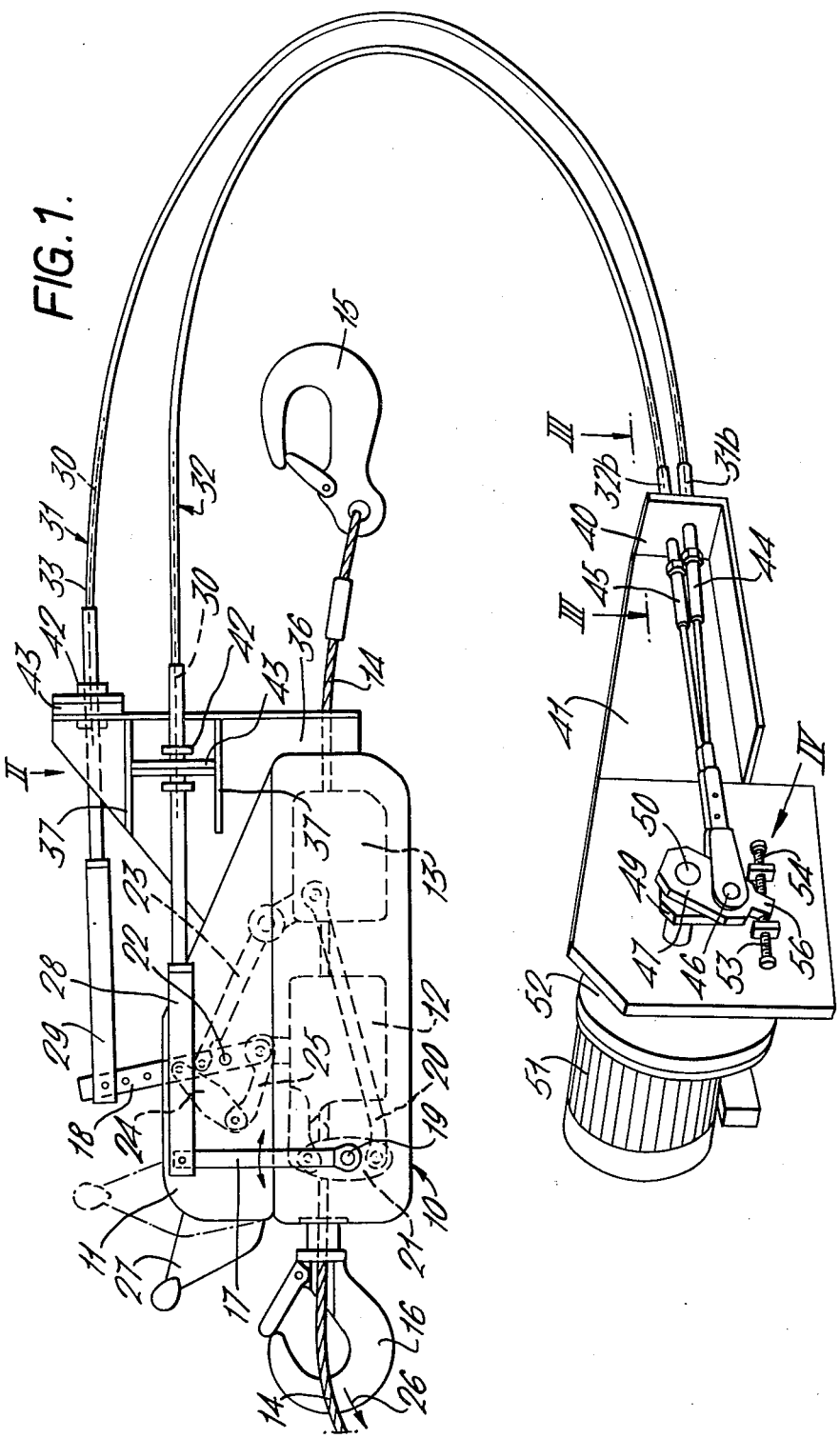

United States Patent [19]
Rinio

[11] 3,881,693
[45] May 6, 1975

[54] CABLE HAULING APPARATUS

[75] Inventor: Johannes A. Rinio, Odenthal, Germany

[73] Assignee: Greifzug GmbH, Bergisch-Gladbach, Germany

[22] Filed: May 7, 1973

[21] Appl. No.: 358,050

[30] Foreign Application Priority Data

May 16, 1972 Germany............................ 2223743
Mar. 7, 1973 Germany............................ 2311148

[52] U.S. Cl................ 254/135 R; 254/76; 254/107
[51] Int. Cl.............................................. B66d 3/00
[58] Field of Search ....... 254/135, 76, 73, 105, 106, 254/107; 74/501, 491, 144–148, 112, 111, 38, 40, 42, 43; 226/134, 156, 158, 162

[56] References Cited
UNITED STATES PATENTS

| | | |
|---|---|---|
| 2,585,101 | 2/1952 | Faure.................................... 254/76 |
| 2,995,339 | 8/1961 | Persiaux................................ 254/76 |
| 3,237,920 | 3/1966 | Dohmeier.............................. 254/105 |
| 3,298,666 | 1/1967 | Prange.................................. 254/105 |
| 3,673,877 | 7/1972 | Lebre.............................. 254/105 X |

Primary Examiner—James B. Marbert
Assistant Examiner—James L. Rowland
Attorney, Agent, or Firm—John J. Dennemeyer

[57] ABSTRACT

Cable hauling apparatus having clamp jaws mounted in two clamp blocks movable in opposite directions by two pivotable operating levers which may be pivoted back and forth to clamp the jaws of the two blocks alternately on a cable passing through the apparatus to advance or release the cable. Each operating lever is connected by a crank to a rotary drive. Preferably at least one of the two operating levers may be disconnected from the drive for one direction of rotation of the drive.

22 Claims, 12 Drawing Figures

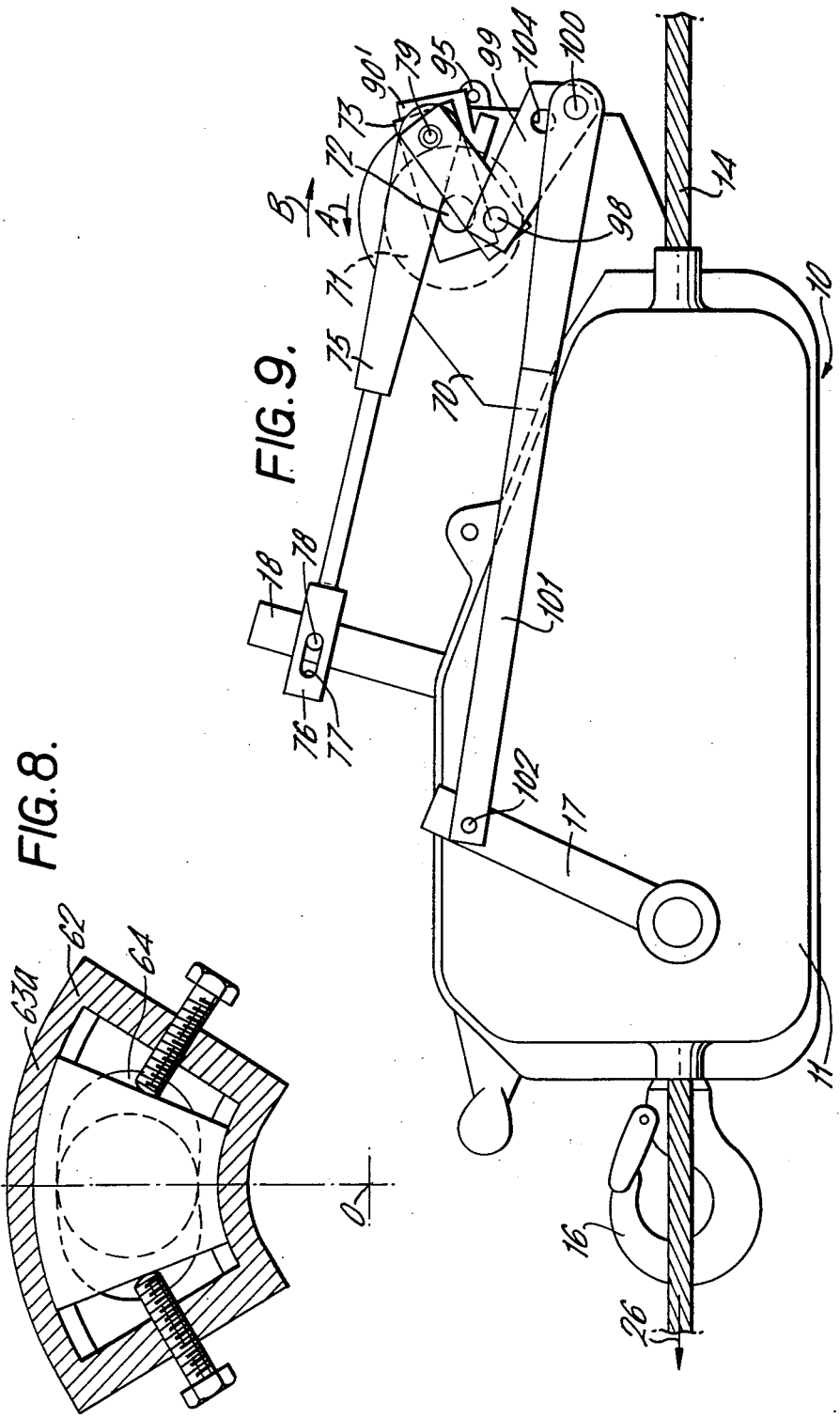

CABLE HAULING APPARATUS

The present invention relates to a cable hauling apparatus comprising clamp jaws which are secured in two clamp blocks that are movable in opposite directions by two pivoted operating levers and which alternately clamp on the cable which is pulled through the apparatus and take along this cable during their movement.

This type of apparatus is already known in the prior art and is used for pulling and releasing endless cable lengths, the cable being pulled through the apparatus by effecting a swinging movement of one of the two operating levers in the one direction, and by a swinging movement of the other operating lever in the other direction. During this procedure both operating levers are connected over lever rods to both blocks in such a manner that during a swinging movement of one lever in one direction one clamp jaw is clamped to the cable and the other clamp jaw is loosely moved along the cable, while during actuation of the other operating lever in the same direction the other clamp jaw is clamped to the cable and the first mentioned clamp jaw is loosely moved along the cable.

It is already known to provide this type of cable hauling apparatus, which is usually actuated manually, with a hydraulic drive consisting of a hydraulic cylinder whose piston rod may be connected in each case to one of the operating levers. This known driving mechanism has the disadvantage that it can be converted from one operating lever to the other operating lever only with great inconvenience, or by providing two hydraulic cylinders for the alternate actuation of both operating levers. A particular disadvantage resides in the jolting operation of the double actuating hydraulic cylinders when converting from pushing to pulling because during this conversion a jolt is produced on the cable each time, and this jolt or shock is generally very undesirable, particularly for raising and lowering operations.

Although it is possible to eliminate this jolting operation of the hydraulic cylinder by means of a complicated hydraulic control this is so expensive and hard to operate that it is not practical for a simple hauling and lifting apparatus of the above mentioned type. Furthermore the cause of a disturbance in the hydraulic system is often hard to determine and can be eliminated only by expert personnel.

Additionally the cable hauling apparatus provided with one or even two hydraulic cylinders becomes so heavy and difficult to handle that the advantages of the simple hand gear are lost.

It is therefore an object of the invention to eliminate these disadvantages and to provide a cable hauling apparatus of the type described above with a simple, mechanical drive, wherein the drive unit does not impose a load on the cable hauling apparatus and assures a practically shock free pulling and releasing of the cable.

The object of the invention is obtained in that the two operating levers are connected over a crank drive to a rotary drive.

This construction has the advantage that the operating levers of the cable hauling apparatus are not swung back and forth with a constant angular speed but that their speed is slowed at the end of each swinging stroke when the crank pin of the crank drive associated with the operating lever has reached its one dead center point.

During its reversal the operating lever is then gradually accelerated, reaches its greatest speed at about its angular speed toward the end of the swinging stroke when the crank pin of the crank drive associated therewith has reached its other dead center point. In this way it is possible to pull the cable practically without jolts through the cable hauling apparatus, whereby not only the cable wears less but the load to be raised or lowered is also not exposed to harmful shocks.

By connecting both operating levers to a rotary drive it is possible, depending on the direction of rotation of the drive, to raise or lower the load hanging on the cable.

According to the invention the operating levers together with their crank drive are connected to the drive in an offset relationship to each other at such an angle that in each of the two directions of rotation of the drive that the leading operating lever produces an effect over the clamp jaws that are connected thereto, while the other operating lever is taken along loosely.

This construction has the advantage that by a simple reversal of the direction of rotation of the drive the driving force changes over from one to the other operating lever.

Crank pins that are adjustable relative to each other may be associated with the operating levers. In this way it is possible to set exactly the dimension by which one crank arm leads the other crank arm in each direction of rotation so that a jamming is prevented which could occur during a premature advancing of the loosely carried operating lever.

It is appropriate that each crank pin is carried by a crank arm and that the second crank arm is fixedly secured and the first crank arm is mounted rotatably on the driven shaft of the drive, and that the first crank arm may be adjusted and set relative to the second crank arm by means of setting devices arranged on the second crank arm. In view of this construction the crank drive is made very simple and easy to control and the crank arms may be adjusted easily and precisely relative to each other.

Both crank pins may be arranged on one crank arm wherein at least one crank pin is adjustably disposed in a slotted guide. Such a construction is very simple and may be improved by making one crank pin adjustable circumferentially relative to the other crank pin in order to avoid differences in the length of the crank arms at the different positions of the crank pin in the slotted guide.

Each operating lever is connected suitably over a flexible pull-push operating element with the crank drive. This construction has the advantage that no direct connection between the drive unit and the cable hauling apparatus is necessary but that the drive unit may be arranged also transversely of the cable hauling apparatus and at a substantial distance therefrom. Furthermore each flexible pull-push operating element may be secured directly to an operating lever wherein the jacket of the pull-push operating element must have a fixed abutment.

The pull-push operating element may consist of a steel cable which is guided in a flexible jacket secured on the one hand to the housing of the cable hauling apparatus and on the other hand to a support device connected to the drive bearing in a pivot bearing. The use of a jacketed steel cable has the advantage over other pull-push operating elements of presenting a particularly high flexibility in all directions, which permits practically any desired arrangement of the drive and its crank drive for the cable hauling apparatus.

It has been observed, however, that during operation, even with a precise setting of the relative interval of the crank pins of the two crank drives, squeezing effects may arise in the apparatus due to the fact that the cable is compressed under load and changes its diameter, which in turn produces variations in the opening path of the clamp jaws. Accordingly it may occur that the loose operating lever is already taken along by the drive before the clamp jaws have completely opened. In that case the clamp jaws slide over the cable in a still partly closed condition which causes a high wear of the cable. In order to avoid this disadvantage provision may be made according to a particularly preferred embodiment of the invention that at least one of the two operating levers together with its crank drive can be disconnected from the rotary drive in a depending relationship with the direction of rotation of the drive.

This embodiment has the advantage that one of the two operating levers can move completely freely when the other operating lever, which is driven by the rotary drive, produces work. Therefore no squeezing effects of any kind can occur because the loose operating lever is not impeded in its movement.

The crank drive associated with one operating lever may have a first crank arm which is constantly connected to the driven shaft of the drive unit while the crank drive associated with the other operating lever has a freely rotatable second crank arm which may be coupled in a form fitting manner over a coupling member with the first crank arm. In this respect it is particularly appropriate that the coupling member is a driving pin which is axially slidable in the crank pin of the first crank arm formed as a bushing and engaging in a bore of the second crank arm. This embodiment has the advantage that by simple forward movement of the driving pin into the bore of the second crank arm the latter may be connected with the first crank arm against rotation so that the rotating moment exerted by the rotary drive is transferred without play also to the second crank arm.

In order to be able to automatically couple and release the two crank arms in a depending relationship of the rotating movement the crank pin bushing has appropriately an extension or lug which projects over the back side of the first crank arm and whose face surface is shaped as a control curve which cooperates with a corresponding cam face of a sleeve member which sits on the back end of the driving pin which is biased by an axial pressure spring. This embodiment has the advantage that a turning of the crank pin bushing relative to the driving pin guided therein produces simultaneously its axial displacement whereby the driving pin is lifted from the bore of the second crank arm or pushed forward into this bore.

In order to impart a limited relative rotation to the sleeve member and to the driving pin connected thereto with respect to the crank pin bushing, a switching member is secured to the sleeve member and cooperates with a switching pin arranged on the cable hauling apparatus. In this arrangement the switching member may consist of a wing disc and two wings defined by an incision, one of the wings sliding with its wing surface along the face side of the spring biased switching pin in the one direction of rotation and repelling the switching pin, while the cut surface of the other incision located in the disc place strikes in the other direction of rotation against the switching pin and causes a rotation of the sleeve member around its axis, and of which the other wing strikes in the first direction of rotation with its incision surface against the switching pin and produces a rotation of the sleeve member in the opposite direction.

It is thus obtained that the driving pin is lifted from the bore of the second crank arm in the one direction of rotation of the driven shaft and remains in the lifted position as long as the direction of rotation of the driven shaft lasts. When the direction of rotation of the driven shaft is reversed the other wing of the wing disc strikes against the switching pin whereby the sleeve member is turned relative to the crank pin bushing and slides along its inclined surface so that the driving pin is pushed forward and catches in the bore of the second crank arm. In view of the fact that during the further course of the rotating movement in this direction the switching pin is not touched any more by the wing disc the driving pin remains in this effective position.

In order to retain the driving pin in its lifted position securely also during the rotating movement at least one notch is provided in the face surface of the lug of the crank pin bushing shaped as a control curve, and a tooth arranged on the cam face of the sleeve member catches into this notch when the driving pin is in the lifted position.

It is particularly appropriate to arrange on the side of the second crank arm facing the driving pin an inclined surface directed toward the bore for the driving pin. This inclined surface lies on the curve which the driving pin describes during a rotation of the first crank arm relative to the second crank arm. This embodiment has the advantage that the driving pin will positively glide into its designated bore in the second crank arm during a rapid movement when the driving pin has already been released and is pressed under the effect of the axial pressure spring against the surface of the second crank arm even before the face surface of the driving pin reaches the bore in the second crank arm.

According to the control curve, the cam face, the switching member, and the switching pin are arranged in such a position relative to each other that the driving pin is lifted from the bore of the second crank arm when the operating lever connected thereto is located in a dead center position. Thereby it is obtained that during the lifting of the driving pin no forces may be exerted that are directed perpendicularly to its axis and that the driving pin is not subjected to a friction pressure.

In order to release not only one but also the other operating lever in its effective position completely from the rotary drive it is appropriate that the connecting rod which pertains to the crank drive that is constantly connected to the driving unit is provided with a longitudinal opening at its free end into which the connecting bolt of the operating lever engages. In this arrangement it is appropriate to associate the crank drive which is constantly connected with the drive through the longitudinal opening with the operating lever for lowering the load, as the play in the longitudinal opening is meaningless during the lowering of the load. However, the operating lever which may be coupled to the drive over the driving pin is connected without play to the drive during the lifting of the load so that the entire stroke distance is used for lifting the load.

The first crank arm consists appropriately of two parts arranged parallel to each other and connected to each other by the crank pin bushing against rotation, and between them one of the connecting rods is disposed. In this arrangement one crank shaft part may be connected to the driven arm of the rotary drive while the crank arm of the crank drive for the other operating lever is rotatably mounted at the other crank shaft part. This embodiment is particularly simple and makes it possible to give to the second crank arm sufficient rotating mobility in the disconnected condition.

Figure 2:
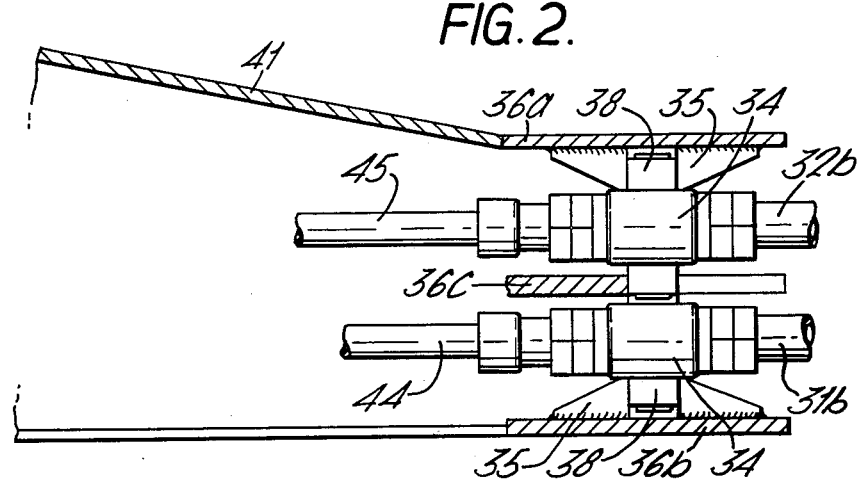
Figure 3:
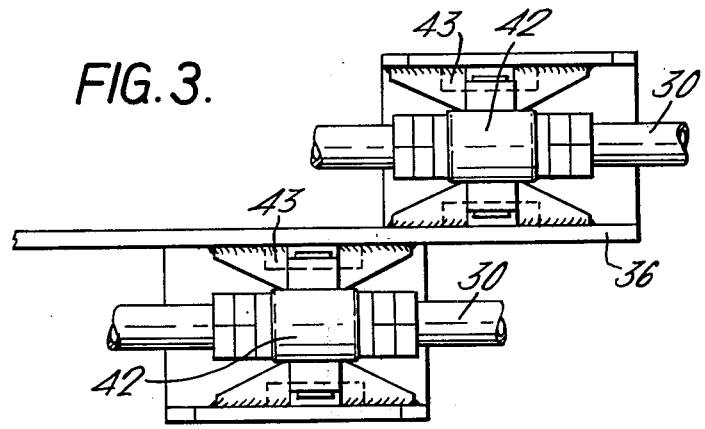
Figure 4:
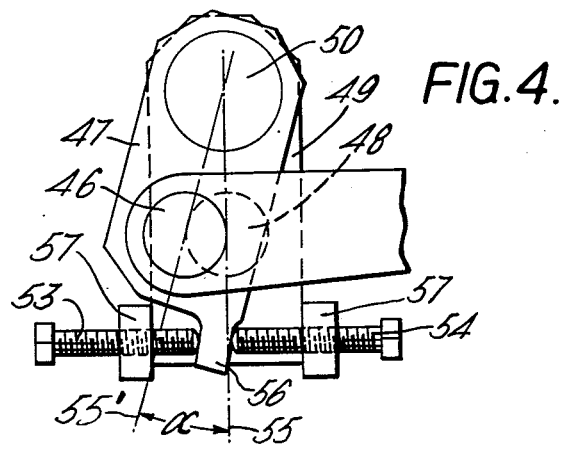
Figure 5:
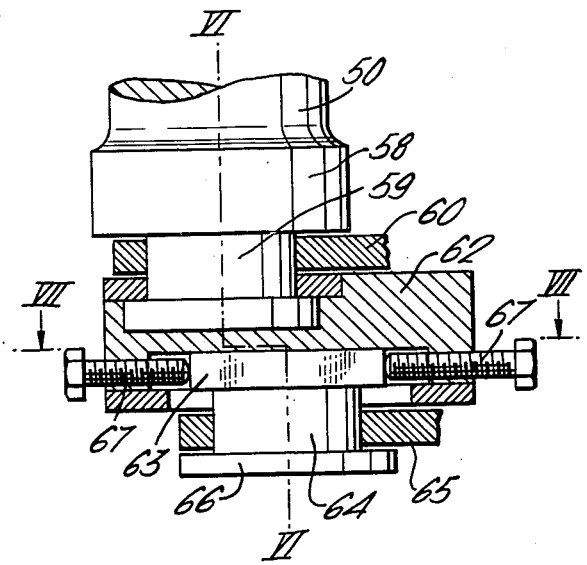
Figure 6:
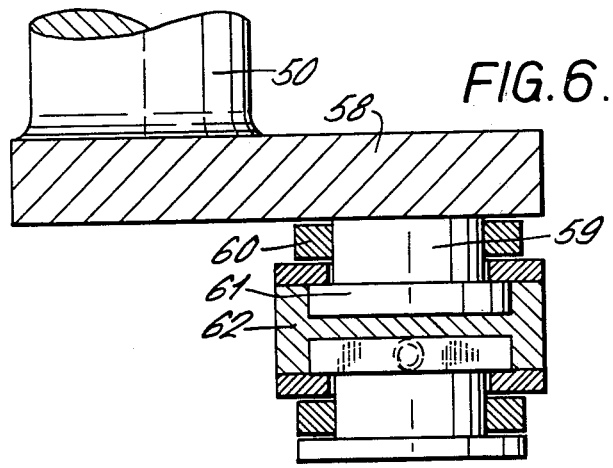
Figure 7:
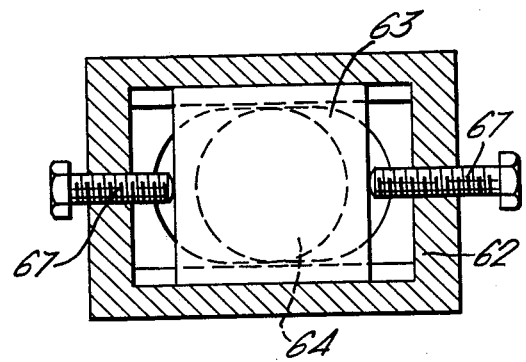
Figure 10:
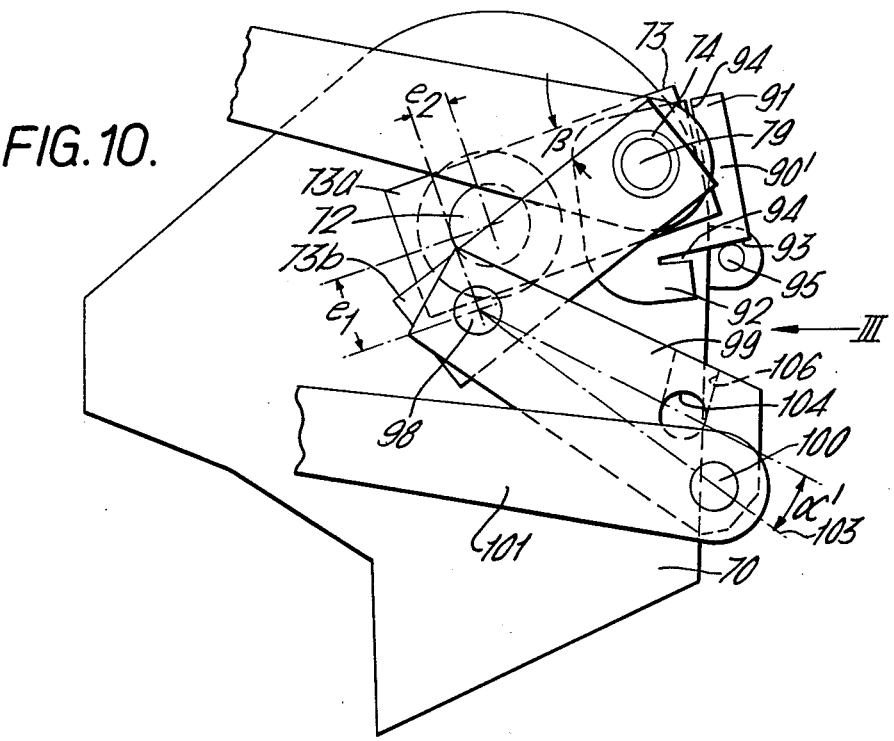
Figure 11:
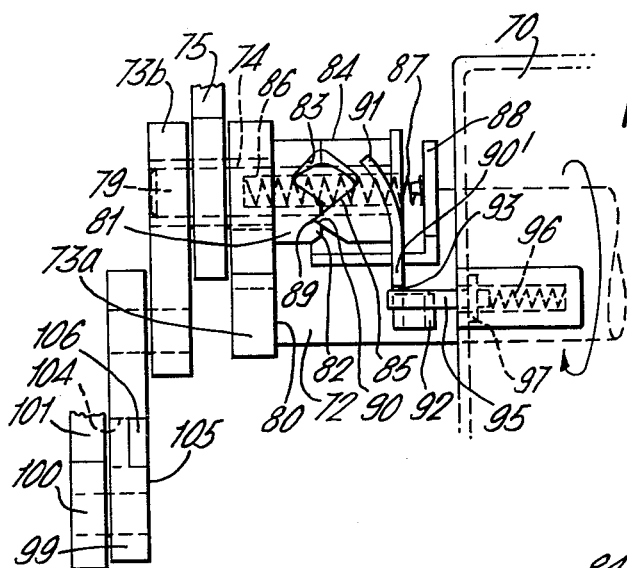
Figure 12:
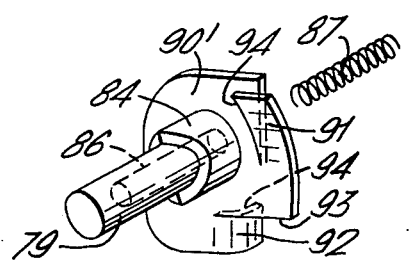

It is particularly appropriate to mount the freely rotatable second crank arm on the first crank arm in such a manner that its point of rotation lies on the side of the driven shaft which is opposite to the crank pin of the first crank arm. Furthermore the point of rotation of the second crank arm may be offset with respect to a straight line extending through the driven shaft and the crank pin of the first crank arm. This embodiment presents the advantage that the second connecting rod may swing back and forth suspended from the crank arm in the disconnected condition of its crank drive and assumes with its crank arm in no position of the first crank arm carrying this crank arm a dead center position. This presents the further advantage that the second crank arm is not coupled with the first crank arm in a dead center position of the connecting rod and the crank arm. The invention will be explained in greater detail hereafter with reference to embodiments illustrated in the accompanying drawings in which:

FIG. 1 is a perspective view of one embodiment of a cable hauling apparatus with a rotary drive according to the invention in a lateral disposition, FIG. 2 is a partial plan view on a larger scale of a portion of the apparatus according to FIG. 1, FIG. 3 is a partial plan view on a larger scale of the drive according to FIG. 1, FIG. 4 is a partial view on a larger scale of the crank drive connected with the drive according to FIG. 1, FIG. 5 is a horizontal section of another embodiment of the crank drive, FIG. 6 is a section of the apparatus according to FIG. 5 along line VI—VI, FIG. 7 is a section of the apparatus according to FIG. 5 along line VII—VII, FIG. 8 is a section of the apparatus according to FIG. 5 along line VII—VII in a somewhat modified embodiment, FIG. 9 is a side view of another embodiment of a cable hauling apparatus according to the invention, FIG. 10 shows a detail part of FIG. 9 on a larger scale, FIG. 11 is a partial front view of the apparatus according to FIG. 10 seen in the direction of arrow III and, FIG. 12 is a perspective view of the driving pin with the sleeve member and wing disc.

Referring to FIG. 1 of the drawings the cable hauling apparatus illustrated here is of the type disclosed for example in German Patent No. 840,586. This cable hauling apparatus 10 consists of a housing 11 in which two blocks 12 and 13 are mounted for sliding movement in the longitudinal direction of the housing. In these blocks 12 and 13 clamp jaws, which are not specifically illustrated in the drawing, are secured, which clamp alternately on the cable 14 that is pulled through the cable hauling apparatus 10 and take along this cable when the blocks 12 and 13 are moved in the housing 11 toward each other or away from each other. At the free end of cable 14 a load hook 15 may be secured on which the load to be lifted or lowered is suspended. An additional load hook 16 is secured to housing 11 of the cable hauling apparatus 10 by means of which the apparatus may be suspended from a fixed point.

The blocks 12 and 13 are moved in opposite directions to each other on cable 14 by means of two operating levers 17 and 18, the operating lever 17 being pivotable about an axis 19 and connected over the link rods 20 and 21 to blocks 12 and 13, and the operating lever 18 being pivotable about a pivot axis 22 and connected over link rods 23, 24 and 25 to blocks 12 and 13.

Upon movement of the operating lever 17 from the position illustrated in FIG. 1 in the counter clockwise direction the blocks 12 and 13 are moved apart and the clamp jaws in block 12 clamp on cable 14 and pull it in the direction of arrow 26 through the housing 11, while the clamp jaws in block 13 are released and slide loosely over cable 14. During this movement of blocks 12 and 13 the operating lever 18 is carried along loosely by the link rods 23, 24 and 25 and is pivoted during this operation in the clockwise direction around axis 22 and thereby trails slightly behind operating lever 17. This operation is described more specifically in the above mentioned German Patent No. 840,586.

An arresting lever 27 is also connected to the clamping device of the cable hauling apparatus and by means of this arresting lever 27 the clamp jaws of the two blocks 12 and 13 may be released (position shown in dash lines) so that the cable may be pulled freely through the apparatus 10.

One end of the actuating rods 28 and 29 is linked to the operating levers 17 and 18, and their other end is connected in a manner not illustrated to the cable 30 of a pull-push mechanism 31 or 32 whose jacket terminates in a sleeve 34 which is mounted for oscillation in a pivot bearing 35. The pivot bearing 35 is carried by a support plate 36 which is welded to the housing 11 of the cable hauling apparatus or is secured thereto in some other suitable manner. The support device consists essentially of three parallel plates 36a, 36b and 36c which are reinforced by cross-plates 37 and which carry the pivot bearings 35 for the pivot pins 38 of sleeves 34.

The other ends 31b and 32b of the pull-push actuating elements 31 and 32 are secured in the front plate 40 of a support member 41 where their jackets 30 terminate in sleeves 42 which are journalled in pivot bearings 43 (FIG. 3). The corresponding ends of the cables 30 of these pull-push actuating elements 31 and 32 are in turn connected each to a connecting rod 44 respectively 45 of which connecting rod 44 is connected by a crank pin 46 to a first crank arm 47 and the other connecting rod 45 by a crank pin 48 to a second crank arm 49. Both crank arms 47 and 49 are mounted on the driven shaft 50 of a driving motor 51, appropriately an electric motor adapted for reversing its direction of rotation, comprising intermediate gear means 52 not specifically illustrated. In this arrangement the second crank arm 49 is secured on driven shaft 50 while the first crank arm 47 is rotatable on the driven shaft 50 and may be adjusted by means of two setting screws 53 and 54 in its angular position relative to the second crank arm 49, so that the connecting line 55' on the center points of the driven shaft 50 and the crank pin 46 is offset relative to the connecting line 55 of the center points of driven shaft 50 and crank pin 48 by an angle α. As may be seen in FIG. 4, the crank arm 47 has a lug 56 against which the setting screws 53 and 54 are pressed, which in turn are rotatable in threaded bushings 57 secured to crank arm 49. Actually, from the fact that the crank arms are offset from each other follows necessarily that also the operating arms are offset from each other because the crank arms are mechanically connected to the operating levers.

In the embodiment illustrated in FIGS. 5, 6 and 7 representing an apparatus for adjusting the angular position of the crank arms 47 and 49 relative to each other only one crank arm 58 is mounted on the driven shaft 50 and securely connected to this shaft. To crank pin 59 which is secured to this crank arm 58, the connecting rod 60 is pivotally connected and corresponds to the connecting rod 45 in FIG. 1. The crank pin 59 carries at its free end a face plate 61 which maintains in position a slotted guide 62 mounted rotatably on crank pin 59. A sliding block 63 slides in the guide 62 and a second crank pin 64 is fixed thereto. The second connecting rod 65 is pivoted on this crank pin 64 and corresponds to the connecting rod 44 shown in FIG. 1. A face plate 66 mounted on the pin 64 prevents a slipping of the connecting rod 65 from crank pin 64.

The sliding block 63 may be displaced in such a manner in the slotted guide 62 by means of two setting screws 67 that are screwed into place laterally that the axis of the crank pin 64 is offset relative to the axis of the crank pin 59 and that the connecting line of the center point of the driven shaft 50 and the crank pin 59 forms relative to the connecting line of the center point of the driven shaft 50 with the center point of the crank pin 64, as shown in FIG. 4, an angle α. In the modified embodiment shown in FIG. 8 the slotted guide 62 is curved according to an arc and the sliding block 63a has the form of the segment of a circle. This presents the advantage that during an angular displacement the center point of the crank pin moves along an arc around the center point 0 of the driven shaft so that the radial distance of the crank pin 64 as well as the radial distance of the crank pin 59 remains the same from the center point 0 of the driven shaft 50 in each angular position.

The operation of the apparatus is as follows.

When the driving motor 51 rotates the driven shaft 50 shown in FIG. 1 in the counter clockwise direction, the second crank arm 49 is ahead of the first crank arm 47. Thereby the operating lever 17 is first actuated by the associated pull-push actuating element 32 and starts its activity wherein the blocks 12 and 13 are pushed apart and the clamp jaws arranged in block 12 clamp on cable 14 and take it along in the direction of arrow 26, while the clamp jaws arranged in the block 13 are sliding loosely on the cable opposite to the pulling direction 26 of the cable. When the operating lever 17 has reached its left end position the crank arm 49 has also reached the right dead center point and begins, upon further rotation of the driven shaft 50 in the counter clockwise direction, to pull the cable 30 in the pull-push element, whereby the operating lever 17 pivots back in the clockwise direction. During this swinging movement the blocks 12 and 13 are again pushed toward each other so that now the clamp jaws arranged in block 13 clamp on to cable 14 and take it along, while the clamp jaws in block 12 slide along loosely opposite the pulling direction 26 of the cable, until the operating lever 17 has reached again its right end position and crank arm 49 its left dead center point. The work cycle then begins anew.

While the operating lever 17 carries out work strokes the operating lever 18 to which the pull-push element 31 is connected is taken along loosely. A squeezing effect does not occur here because the crank arm 47 associated with operating lever 18 is rotated relative to the crank arm 49 by the angle α in the clockwise direction, so that it trails the crank arm 49 upon a rotation of the driven shaft 50 in a counter clockwise direction. The actuating lever 18 transfers therefore no power to the two blocks 12 and 13. When the direction of rotation of the driven shaft 50 is reversed and when this shaft rotates in the position shown in FIG. 1 now in the clockwise direction, the crank pin 46 of the crank arm 47 will first cross over the left dead center point. For this reason also the operating lever 18 is first forced by the pull-push element 31 to carry out a swinging movement toward the left, while the operating lever 17 is still swung to the right and reaches only its right end position. The separated blocks 12 and 13 are thereby pushed together by the operating lever 18, while the clamp jaws in block 12 clamp on to cable 14 and release it with the load hanging on the load hook opposite to the direction of arrow 26, while the clamp jaws in block 13 slide loosely over cable 14. As soon as the crank pin 46 has reached its right dead center point and the operating lever 18 has reached its left end position, its direction of movement is reversed and the blocks 12 and 13 are again spread apart so that now the clamp jaws clamp on to cable 14 in block 13 and release it while the clamp jaws in block 12 slide loosely over the cable.

The reason why always the first contacted operating lever transfers its force to blocks 12 and 13 and controls the clamping effect of the clamp jaws resides in the fact that the mechanism for controlling the clamping effect to the clamping jaws produces a play between the two operating levers in their mutual swinging capacity, and the one particular operating lever with which a force is exerted on the blocks makes the other operating lever ineffective through the control mechanism. This control mechanism is a special feature of the cable hauling apparatus to be used with two operating levers for pulling and releasing endless cable lengths.

With reference to FIGS. 9 through 12 a particularly advantageous embodiment of the invention is here illustrated. This embodiment differs from the embodiments already described by the fact that the jacketed cables between the connecting rods and the operating levers are not provided. What is more important however, is the fact that in the embodiment according to FIGS. 9 through 12 at least one of the two operating levers may be disconnected with its crank drive from the rotary drive in a depending relationship of its direction of rotation.

In FIG. 9 a cable hauling apparatus 10 is illustrated which shows the same construction as that illustrated in FIG. 1. This cable hauling apparatus 10 consists also of a housing 11 in which two blocks having clamping jaws that are movable away from each other are mounted slidably. The clamp jaws clamp alternately on cable 14 which is pulled through the cable hauling apparatus 10 and take along the cable when they are moved toward each other or away from each other. The cable hauling apparatus 10 is suspended by means of a load hook 16 to a fixed point, while the load is secured to the ends of cable 14 lying opposite the load hook 16, and the cable is pulled during lifting of the load in the direction of the arrow 26 through the apparatus. The operating lever 17 shown in FIG. 9 at the front side of the housing is used to lift the load while the actuating lever 18 arranged at the back side of the apparatus is used to lower the load hanging on cable 14.

A support plate 70 is secured to the housing of the cable hauling apparatus and at its back side a rotary drive 71, which is only indicated here, for example a reversible geared motor, is mounted whose driven shaft 72 extends through the support plate 70. A first crank arm 73 is mounted on the driven shaft 72 and is connected against rotation with the driven shaft 72 and the connecting rod 75 of the crank drive associated with the operating lever 18 is connected to its crank pin 74. The connecting rod 75 has a longitudinal opening 77 at its free end 76 in which the connecting bolt 78 of the operating lever 18 can engage.

From FIGS. 10 and 11 it may be seen that the first crank arm 73 consists of two adjacent parallel mounted parts 73a and 73b which are connected to each other against rotation by means of crank pin 74 and between these parts the connecting rod 75 is arranged. The crank pin 74 is formed as a hollow bushing and has a lug 81 which projects over the back side 80 of the part 73a of the first crank arm 73, and the front face 82 of the lug 81 is shaped to constitute a control curve 83.

On the inside of the hollow crank pin bushing 74 a driving pin 79 is guided for axial sliding movement and carries at its rear end a sleeve piece 84 which presents at its forward face surface a cam face 85 which cooperates with the control curve 83 of the lug 81. At the rear face side the driving pin 79 has an axially extending pocket hole 86 in which an axial pressure spring 87 is lodged which bears with its rear end projecting from the pocket hole against an abutment plate 88 secured to the first crank arm and urges the driving pin 79 together with the sleeve member 84 fixed thereto in the position shown in FIG. 11 to slide to the left.

Next to the control curve 83 two notches 89 are provided on the face surface 82 of the lug 81 into which a tooth 90 arranged adjacent the cam face 85 on the sleeve member 84 may catch.

At the rear side of the sleeve member 84 a wing disc 90' is secured, whose shape can be seen in FIG. 12. The wing disc 90' consists of a substantially flat plate from which two wings 91 and 92 that are approximately perpendicular to each other are bent which are defined each by a cut 94. As shown in FIG. 12 the wing 91 is bent forwardly, or to the left as shown in FIG. 11, while the wing 92 is bent to the rear as shown in FIG. 12, and to the right as shown in FIG. 11. The wing disc 90' cooperates, in a manner to be described more fully hereafter, with a switching pin 95 which is mounted parallel to the driven shaft 72 for axial sliding movement in support plate 70 and is under the effect of a spring 96 which biases the switching pin 95 out of this support plate, i.e. in FIG. 11 to the left, until its enlarged band 97 bears against the back side of the support plate 70.

At the front part 73b of the first crank arm 73 a second crank arm 99 is mounted freely rotatably on the end opposite the crank pin 74 by means of a pivot pin 98 and belongs to the second crank drive which is associated with the operating lever 17 for lifting the load. The second crank arm 99 carries at its end opposite the pivot pin 98 a crank pin 100 to which the connecting rod 101 is connected, which is coupled over the pin 102 rotatably but non-slidably with the operating lever 17.

In the second crank arm 99 a bore 104 is arranged at an angle $\alpha$ to the connection line 103 of the pivot pin 98 and crank pin 100. This bore 104 is located at the same distance from pivot pin 98 as the crank pin bushing 74, and its diameter corresponds to the diameter of the driving pin 79. On the back side 105 of the second crank arm facing the driving pin 79 an inclined surface 106 is arranged which is directed toward the bore 104 for the driving pin 79, and this inclined surface 106 is located on the curve which the driving pin 79 describes during a rotation of the first crank arm 73 relative to the second crank arm 99 on the latter. It may be seen from FIG. 10 that the part 73b of the first crank arm 73a which is shown in the drawing as being located forward is swung out relative to the rearward part 73a and angle $\beta$, so that the pivot pin 98 for the second crank arm 99 lies by the quantity $e_1$ below the connection line between the driven shaft 72 and the crank pin 74. Furthermore the interval between the pivot pin 98 and the crank pin 74 is larger by the quantity $e_2$ than the interval between the driven shaft 72 and the crank pin 74. The pivot point for the second crank arm 99 does not coincide with the pivot axis of the driven shaft 72 when the crank arm is loose but describes during its rotation a circle around the latter.

The operation of this apparatus is as follows. In the position illustrated in FIGS. 9 through 11 the second crank arm 99 is free of the driving pin 79 and freely rotatable around its pivot pin 98. The rotating movement exerted by the rotary drive 71 over the driven shaft 72 in the direction of arrow A on the first crank arm 73 acts over the connecting rod 75 on the operating lever 18 and swings this lever back and forth wherein the load hanging from cable 14 is lowered in the opposite direction of arrow 26.

During this direction of movement the driving pin 79 is lifted from the bore 104 of the second crank arm 99 and assumes the position illustrated in FIG. 11, in which the cam face 85 is located at an interval from the control curve 83 and the tooth 90 catches in the notch 89 of lug 81. The switching pin 95 slides along the wing surface 91 and is repelled during each revolution against the effect of spring 96.

When the driving force is to be transferred from the rotary drive 71 to the operating lever 17 for lifting the load hanging on cable 14, the motor is reversed so that now the driven shaft 72 rotates in the direction of arrow B. Now the longitudinal opening 77 slides over the pin 78 of the operating lever 18 without moving it. The first crank arm 73 moves, as shown in FIG. 10, in the clockwise direction toward the second crank arm 99. Thereby the cutting surface 93 of the cut defining the wing 92 strikes against the switching pin 95. Upon further rotation the sleeve member 84 is rotated relative to the lug 81 so that the tooth 90 is lifted from the notch 89 and slides along the control curve 83 into the associated opening of this control curve. Thereby the driving pin 79 is pushed under the effect of the axial pressure spring 87, in the position shown in FIG. 11, toward the left and bears against the arc-shaped slanted surface 106 at the rear side of the second crank arm 99, at which the first crank arm 73 has arrived in the meantime. Upon further rotation the driving pin 79 which is biased by a spring pressure, slides into bore 104 of the second crank arm so that the latter is connected with the first crank arm in a form fitting manner. The crank arms 73 and 99 are now driven together by the driven shaft 72 and the driving moment is transferred over the connecting rod 101 to the operating lever 17 while the operating lever 18 trails free of any squeezing effect because the second crank arm 99 is offset by the angle $\alpha'$ relative to the first crank arm 73 and leads in respect to this crank arm, and because the second operating lever 18 is not rigidly connected with the connecting rod 75 through the connection 77, 78 of the longitudinal opening.

When the transition from a lifting process to a lowering process is desired the rotary drive is reversed so that the driven shaft 72 rotates again in a direction of the arrow A. As soon as the operating lever 17 is located in a dead center position the wing 92 strikes the switching pin 95 and is retained by the latter during further rotation of the crank pins. Thereby the sleeve member 84 is rotated again relative to the lug 81 so that the cam face 85 slides along the control curve 83 and the driving pin 79 together with the sleeve member 84 is caused to slide axially and lifted from bore 104. The operating lever 17 is now disconnected from the rotary drive and the rotating moment is transferred over the connecting rod 75 again to the operating lever 18.

The present invention is not limited to the embodiments described and illustrated. For example it is also possible to use as pull-push actuating element also flexible rods guided between balls or a different driving motor. It is also possible to connect to the driven shaft of the driving motor several crank drives and to actuate from that point simultaneously a plurality of cable hauling apparatus. This can be of advantage for example when a plurality of cable hauling apparatus is to cooperate simultaneously in lifting one load. Finally it is also possible to design the crank drive with the two relatively offset crank pins somewhat differently without thereby leaving the scope of the present invention.

What is claimed is:

1. A cable hauling apparatus comprising clamp jaws mounted in two blocks that are movable in opposite directions, the jaws clamping alternately on a cable pulled through the apparatus and taking this cable along as they move, two pivoted operating levers, each being drivingly connected to both said blocks to move said blocks in said opposite directions: the improvement consisting in that both operating levers are connected through a crank drive to a rotary drive, said operating levers being connected with their crank drive at such an angle $\alpha$ in an offset relationship to each other with the rotary drive that in each of the two directions of rotation of the rotary drive in each case one of the two operating levers leads the other lever with such an interval that only the leading operating lever produces an effect over the clamp jaws connected thereto while the other operating lever is taken along loosely.

2. A cable hauling apparatus according to claim 1 wherein crank pins are associated with the two operating levers and are angularly adjustable relative to each other.

3. A cable hauling apparatus according to claim 2 wherein each crank pin is carried by a crank arm and the second crank arm is fixedly mounted while the first crank arm is rotatably mounted on the driven shaft of the rotary drive, and that the first crank arm is adjustable and adapted to be set in a fixed position relative to the second crank arm by setting means arranged on the second crank arm.

4. A cable hauling apparatus according to claim 2 wherein the two crank pins are arranged on one crank arm and at least one crank pin is adjustably disposed in a sliding guide.

5. A cable hauling apparatus according to claim 4 wherein one crank pin is adjustable relative to the other crank pin in the circumferential direction.

6. A cable hauling apparatus according to claim 5 wherein each operating lever is connected to the crank drive over a flexible pull-push element.

7. A cable hauling apparatus according to claim 6 wherein the pull-push element consists of a steel cable that is guided in a flexible jacket that is secured at one end to the housing of the cable hauling apparatus in a pivot bearing and at the other end to a support member connected with the drive bearing.

8. A cable hauling apparatus according to claim 1 wherein at least one of the two operating levers is disconnected with its crank drive from the rotary drive in response to a predetermined direction of rotation of said rotary drive.

9. A cable hauling apparatus according to claim 8 wherein the crank drive associated with one of the two operating levers has a first crank arm which is constantly coupled with the driven shaft of the driving unit and that the crank drive associated with the other operating lever has a freely rotatable second crank arm which may be coupled over a coupling member with the first crank arm in a form fitting manner.

10. A cable hauling apparatus according to claim 9 wherein the coupling member is a crank pin which is axially slidable in the crank pin of the first crank arm formed as a bushing and is adapted to engage in a bore of the second crank arm.

11. A cable hauling apparatus according to claim 10 wherein the crank pin bushing has a lug which projects over the back side of the first crank arm and whose face surface is shaped as a control curve which cooperates with a corresponding cam face of a sleeve member which is disposed on the rear end of the driving pin which is subjected to the effect of an axial pressure spring.

12. A cable hauling apparatus according to claim 11 wherein a switching element is secured to the sleeve member and cooperates with a switching pin arranged on the cable hauling apparatus to impart a limited rotation to the sleeve member.

13. A cable hauling apparatus according to claim 12 wherein the switching element consists of a wing disc having two wings defined by a cut, one of the wings sliding with its wing surface along the side of the spring biased switching pin during rotation in the direction A and repelling the switching pin, while the cutting surface of the other cut located in the disc plane strikes in the other direction of rotation B against the switching pin and causes a rotation of the sleeve member around its axis, and the other wing striking in the direction of rotation A with its cutting surface against the switching pin produces its rotation in the opposite direction.

14. A cable hauling apparatus according to claim 13 wherein at least one notch is provided in the face surface of the lug of the crank pin bushing shaped as a control curve and into this notch a tooth mounted on the cam face of the sleeve member catches when the driving pin is in the lifted position.

15. A cable hauling apparatus according to claim 14 wherein a slanted surface is arranged on the side of the second crank arm facing the driving pin and directed toward the bore for the driving pin, this slanted surface being located on the curve which is described by the driving pin during a rotation of the first crank arm relative to the second crank arm.

16. A cable hauling apparatus according to claim 15 wherein the control curve, the cam face, the switching element and the switching pin are arranged in such a disposition relative to each other that the driving pin is lifted from the bore of the second crank arm when the operating lever connected thereto is located in the dead center position.

17. A cable hauling apparatus according to claim 16 wherein the connecting rod pertaining to the crank drive which is constantly coupled to the driving unit has a longitudinal opening at its free end into which the connecting bolt of the operating lever is engaged.

18. A cable hauling apparatus according to claim 17 wherein the crank drive connected with the drive through the longitudinal opening and constantly coupled thereto is associated with the operating lever for lowering the load.

19. A cable hauling apparatus according to claim 18 wherein the motor for the rotary drive is mounted directly on the housing of the cable hauling apparatus.

20. A cable hauling apparatus according to claim 19 wherein the first crank arm consists of two adjacent, parallel parts which are connected to each other against rotation by the crank pin bushing and between which a connecting rod 101 is arranged, and that one crank shaft part is connected to the driven shaft of the rotary drive while on the other crank shaft part the crank arm of the crank drive for the other operating lever is rotatably mounted.

21. A cable hauling apparatus according to claim 20 wherein the freely rotatable second crank arm is mounted to the first crank arm in such a way that its point of rotation is located on the side of the driven shaft located opposite the crank pin of the first crank arm.

22. A cable hauling apparatus according to claim 21 wherein the point of rotation of the second crank arm is offset relative to a straight line passing through the driven shaft and the crank pin of the first crank arm.

* * * * *

UNITED STATES PATENT OFFICE
CERTIFICATE OF CORRECTION

Patent No. 3,881,693     Dated  May 6, 1975

Inventor(s)  JOHANNES A. RINIO

It is certified that error appears in the above-identified patent and that said Letters Patent are hereby corrected as shown below:

On page 1 of the patent substitute the figure of drawing herebelow for that appearing on the patent.

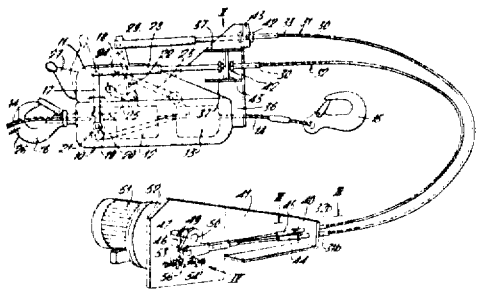

Signed and Sealed this sixteenth Day of September 1975

[SEAL]

Attest:

RUTH C. MASON
Attesting Officer

C. MARSHALL DANN
Commissioner of Patents and Trademarks